J F. ROSE.
PULLEY.
APPLICATION FILED AUG. 9, 1920.
1,385,276.
Patented July 19, 1921.
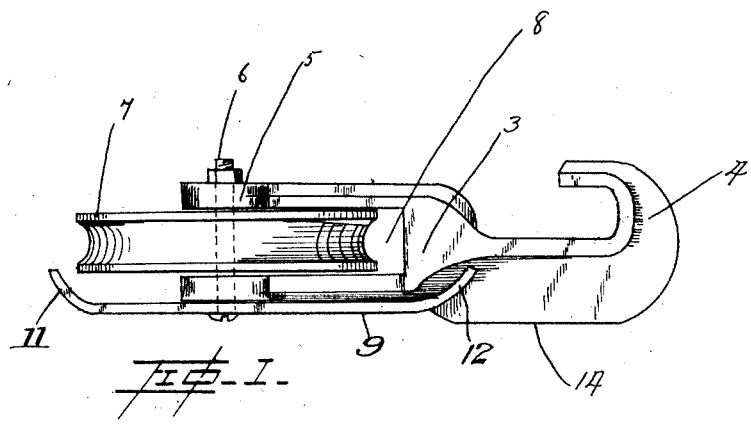
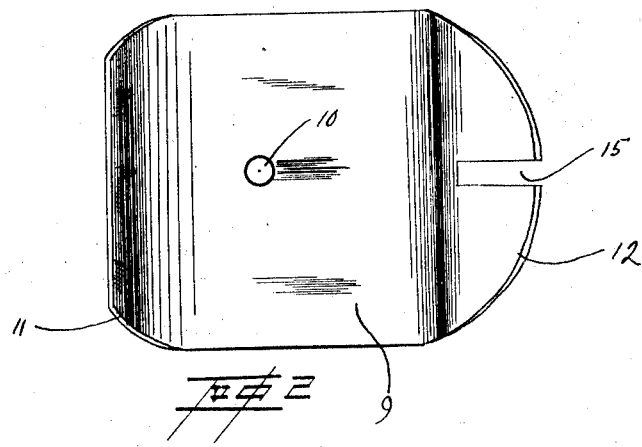

UNITED STATES PATENT OFFICE.

J FRASER ROSE, OF TRENTON, NOVA SCOTIA, CANADA.

PULLEY.

1,385,276.  Specification of Letters Patent.  Patented July 19, 1921.

Application filed August 9, 1920. Serial No. 402,476.

*To all whom it may concern:*

Be it known that I, J FRASER ROSE, a citizen of the Dominion of Canada, residing at Trenton, in the county of Pictou and Province of Nova Scotia, Canada, have invented certain new and useful Improvements in Pulleys, of which the following is a specification.

This invention relates to pulleys which are commonly used on constructions where the pulleys will at certain times be dragged along the ground.

The object of my invention is to provide a shield in combination with the pulley which will keep grass and weeds from getting entangled between the wheel and the body portion of the pulley.

With these and other objects in view, the invention consists in the construction, combination and arrangement of parts as will be hereinafter fully described, illustrated in the accompanying drawings, and pointed out in the claims hereunto appended.

Figure 1 is a side view of my invention, and

Fig. 2 is an enlarged plan view of the shield.

Referring to the drawings like numerals designate like parts in the various drawings.

3 indicates the body portion of a pulley having a hook-shaped portion 4 at one end and a bifurcated portion 5 at the other end. The bifurcated portion is provided with transverse openings which receive a bolt 6 on which is mounted the pulley wheel 7.

With many pulleys the dragging of them through grass and weeds causes weeds and other obstructions to fill in the opening as indicated at 8 on account of the wheel turning and dragging these into this opening.

After considerable experimental work, I have found that a shield with upwardly extending ends will provide somewhat of a sleigh construction whereby the pulleys will ride over the top of the grass, weeds and other obstructions instead of drawing them into obstructive position.

9 is the shield provided with an annular opening 10 through which the bolt 6 passes in holding the shield in proper position on the pulley. This shield is bent upwardly as at 11 and 12. Many pulleys are provided with an outwardly extending ridge 14 which reinforces the hooked end portion 4.

15 is a slot cut in the upwardly bent end 12 to allow the ridge 14 to fit into this upwardly bent portion. In this way the shield is kept in proper alinement with the longitudinal direction in which the pulley will be pulled and in view of the fact that the shield is turned up at both ends, it will ride the pulley over the grass and weeds and keep them from coming in contact with the turning wheel 7.

From the foregoing it is thought that the construction of my invention will be clearly understood, and, therefore, a more extended explanation has been omitted.

What I claim as new is:

1. A pulley block consisting of a body member, an outwardly extending hook-shaped member, said hook-shaped member being provided with a ridge, the opposite end of said body portion being bifurcated, annular openings formed in the ends of said bifurcated end, a bolt passing through said openings, a pulley wheel mounted on said bolt, a shield independent of said body member and fitted to the under side of said bifurcated end and being held thereto by said bolt, one end of said shield being bent upwardly of the outer side of said wheel and the other side being slotted and bent upwardly of said hooked portion.

2. The combination with a pulley block with hooked end and a pulley wheel held by a bolt in said block, of a shield independent of said block and held by the bolt of said pulley, one end of said shield being bent upwardly of the outer side of wheel of said pulley, the other end of said shield being split and being bent up on each side of the hooked end of said pulley, so as to provide a shield against grass and weeds coming in contact with the said wheel.

In testimony whereof I affix my signature in the presence of two witnesses.

J FRASER ROSE.

Witnesses:
A. T. MCKAY,
JOH H. MACKAY.